United States Patent [19]
Bullock et al.

[11] Patent Number: 5,351,186
[45] Date of Patent: Sep. 27, 1994

[54] SYSTEM AND METHOD FOR OBTAINING INFORMATION CONCERNING A PRODUCT OR A SERVICE

[75] Inventors: Wayne J. Bullock, Paoli; Kenneth S. Fertner, Richboro; Eugene Klein, Philadelphia, all of Pa.

[73] Assignee: Bullock Communications, Inc., Malvern, Pa.

[21] Appl. No.: 642,257

[22] Filed: Jan. 16, 1991

[51] Int. Cl.$^5$ .............................................. G06F 15/21
[52] U.S. Cl. ......................... 364/401; 364/400; 371/62; 371/63; 371/64; 371/65
[58] Field of Search ............... 364/401, 400; 371/62, 371/63, 64, 65, 66; 235/375

[56] References Cited

U.S. PATENT DOCUMENTS

| | | | |
|---|---|---|---|
| 3,304,416 | 2/1967 | Wolf | 235/92 |
| 4,002,886 | 1/1977 | Sundelin | 235/61.7 R |
| 4,500,880 | 2/1985 | Gomersall et al. | 340/825.35 |
| 4,645,036 | 2/1987 | Nestler | 186/55 |
| 4,674,041 | 6/1987 | Lemon et al. | 364/401 |
| 4,766,295 | 8/1988 | Davis et al. | 235/383 |
| 4,825,045 | 4/1989 | Humble | 235/383 |
| 4,833,308 | 5/1989 | Humble | 235/383 |
| 4,905,094 | 2/1990 | Pocock et al. | 358/342 |
| 4,973,952 | 11/1990 | Malec et al. | 340/825.35 |

Primary Examiner—Roy N. Envall, Jr.
Assistant Examiner—Ari M. Bai
Attorney, Agent, or Firm—Panitch Schwarze Jacobs & Nadel

[57] ABSTRACT

A system and method for obtaining information concerning a product or service to a user which includes a remotely located source of computer-based information for generating and transmitting encoded data, including encoded audio data, pertaining to a plurality of products or services. An on-site computer in communication with the remote information source is employed for receiving and storing the data from the remote information source. The on-site computer source is in communication with the plurality of user units located within the facility, each unit being associated with a particular product or service. Each unit receives and stores product or service data from the on-site computer, recalls the data and provides the data in an audible form to the user upon activation of the unit by the user.

15 Claims, 10 Drawing Sheets

SYSTEM AND METHOD FOR OBTAINING INFORMATION CONCERNING A PRODUCT OR A SERVICE

BACKGROUND OF THE INVENTION

The present invention relates generally to a system and a method for obtaining information concerning a product or service at the product or service location and, more particularly, to such a system and a method which employs an existing transmission medium for the delivery of the information to the product or service location, whereby the information is delivered to a user by audio means.

When a consumer is at a retail establishment, for example, and is attempting to ascertain information concerning a particular product for potential purchase, the consumer often is unable to obtain information beyond that which can be directly observed by examining the product. Store representatives are not always knowledgeable about the products and, often, simply cannot be located, resulting in the customer being unable to obtain the desired information.

In the past, methods have been developed for displaying pricing and other information of a more general nature on shelf display tags. The most common prior art method involves the transmission of an optical signal from an electronic transmitter which includes an address code, to a display tag which accepts the pricing information from the optical transmitter and displays the received information on the particular display tag. With such existing electronic pricing display systems, the display tag automatically displays whatever information is received without any decision by the consumer as to whether the information is desired.

A need has developed for a system with which the consumer can obtain detailed audible information concerning a product or service beyond the mere price of the product or service. Such a system is particularly desirable in retail establishments where more in-depth information concerning a potential purchase is often desired. For example, when a consumer is shopping for major purchases, such as appliances, the consumer often desires to have specialized information concerning the product, such as warranties, service requirements, etc. that the store salesman is unable to provide.

The present invention comprises a system and a method for providing information concerning a product or service at the location of the product or service. The information is provided over a computer-based system in which the information may be entered in audio form at a first or remote location and is encoded and transmitted to the retail establishment. The information transmitted from the first location may be received and modified, if desirable, by a computer located at a second or on-site location within the facility. With the system and method of the present invention, all of the information is preferably transmitted over a standard telephone data line. At the receiver location, the transmitted information is stored in a computer-based memory device for selective transmission to individual user activated units at desired locations within the facility, where the information can be obtained upon activation by the consumer as desired.

SUMMARY OF THE INVENTION

Briefly stated, the present invention comprises a system and method for providing product or service information to a user within a facility upon user request. The system includes a source of computer-based information at a remote location for generating and transmitting encoded data, including encoded audio data pertaining to a plurality of products and services, to a second, on-site computer located within the facility. The on-site computer receives and stores the data from the remote information source. The on-site computer also transmits the data to a plurality of user units within the facility. Each user unit receives and stores data concerning a particular product or service with which the unit is associated. The user unit provides audible information pertaining to the particular product or service upon activation by the user.

BRIEF DESCRIPTION OF THE DRAWINGS

The foregoing summary, as well as the following detailed description of a presently preferred embodiment of the invention, will be better understand when read in conjunction with the appended drawings. For the purpose of illustrating the invention, there is shown in the drawings an embodiment which is presently preferred. It should be understood, however, that the present invention is not limited to the particular arrangement and instrumentalities shown. In the drawings.

DESCRIPTION OF PREFERRED EMBODIMENT

Figure 1:
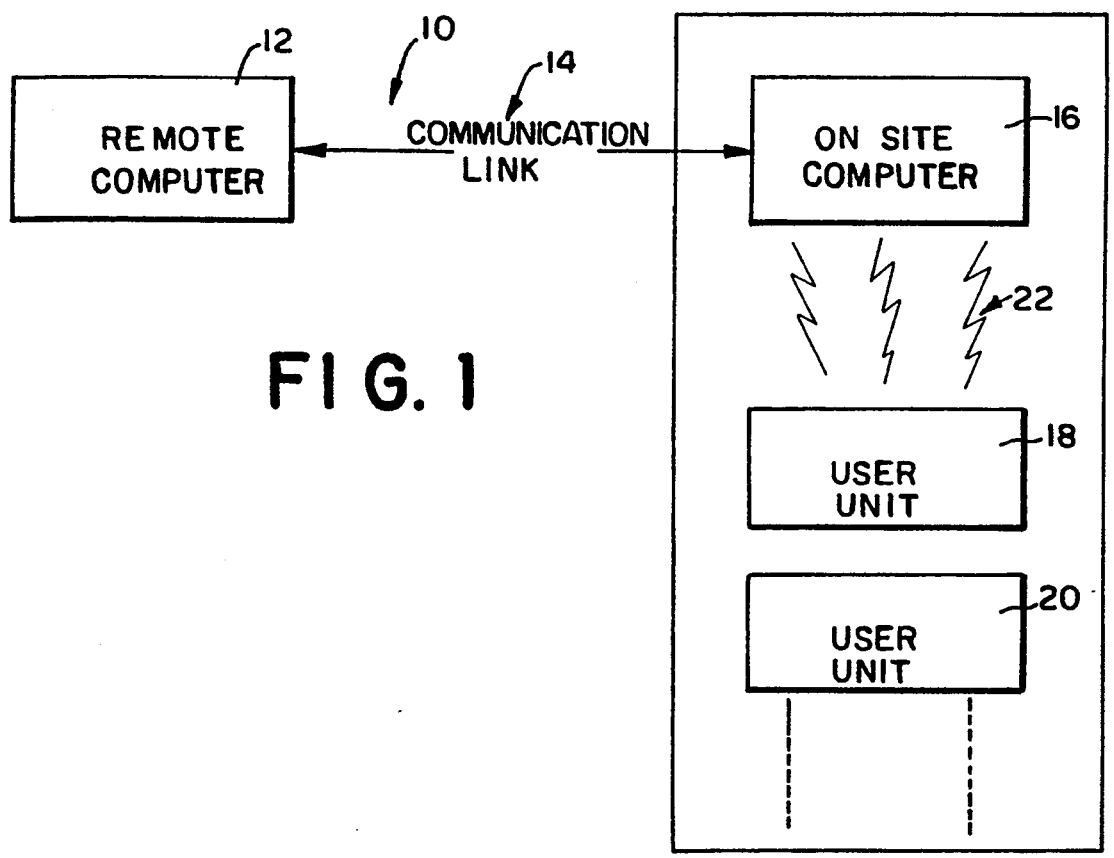
FIG. 1 is a general schematic block diagram of a system for providing product or service information to a user in accordance with a preferred embodiment of the present invention.

The presently preferred embodiment of the invention described below relates to a system and a method for obtaining audible information regarding a particular product or service at or near a location in which the product or service is being marketed or sold.

In general, in the disclosed embodiment, the information to eventually be provided to a user is initially placed in a first computer or an information source at a location remote from the location where the information is provided to the user. From the remote location, the information is transmitted to a second or on-site computer, preferably located within the same facility at which the product or service information is provided to the user. After the information is received by the on-site computer, it is stored and subsequently transmitted to individual user units within the facility, each user unit receiving and storing information related to the one particular product or service with which the particular user unit is associated. Upon activation by of the user unit by a user, the stored information is converted into an audible form which is understandable to the user.

Thus, with the present embodiment, a user who is examining a particular product or service and wishes to obtain additional information to assist in making a decision regarding purchase or use of the product or service, may activate a controller at the user unit, and the information sought by the user is heard by the user at the same location as the product or service. The system thus allows the user to simultaneously examine the product or service, while receiving additional audible information regarding that particular product or service. Different types of information, such as pricing, warranties, installation instructions, servicing, etc. could be transmitted and received with the system, and the use of the remote computer allows the information to be updated or otherwise changed and the changes in the information to be provided to the user on an immediate basis.

Hence, it will be appreciated by those skilled in the art that while the present description pertains to a preferred system and method for the transmission of data to a facility where it can be used for assisting the consumer in a potential purchase of a product or service, the system could be employed for the transmission of information other than product or service information, such as warranties, pricing information, advertising, or any other information which may be desirable to supply to a user upon user request, and where the information sent may be changed or modified on a regular basis. For example, a retail establishment may change the merchandise at the establishment on a change of seasons, at which time information alongside the product or service would become useless when the merchandise is changed. Similarly, pricing information may change due to sales, markdowns, etc. With the present system, the information need only be modified at the remote computer and then retransmitted to the on-site computer for eventual transmission to the user unit at the product or service location. Alternatively, the information may be modified at the on-site computer which may also generate additional information. In addition, it should be appreciated by those skilled in the art, that such information could be transmitted utilizing different transmission systems, such as radio broadcast, a telephone line, infrared transmission, etc.

FIG. 1 is a schematic block diagram illustrating the primary components of a preferred embodiment of the system, hereinafter referred to as the system, 10. The principal components of the system 10 are: a remotely located source of computer-based information or first computer 12, an on-site or second computer 16 located within a facility remote from the first computer 12, a plurality of user units 18 and 20 (only two illustrated) located within the same facility as the on-site computer 16, a communications link 14 between the first computer 12 and the on-site computer 16, and a communications link 22 between the on-site computer 16 and the user units 18 and 20.

It should be appreciated by those skilled in the art that the primary purpose of the remotely located computer-based information source or first computer 12 is to generate and transmit encoded data relating to a plurality of particular products or services to the on-site computer 16 over the communications link 14. The on-site computer 16 receives and stores the data from the first computer 12, and subsequently transmits the data over communications link 22 to the user units 18 and 20, each user unit receiving data which pertains to a particular product or service with which the user unit is associated. The data received by each of the user units 18, 20 is stored and when a user unit is activated by a user, the data is retrieved, converted into an appropriate form, and provided to the user, preferably in an audio form, or some other form which can be understood by the user.

Figure 2:
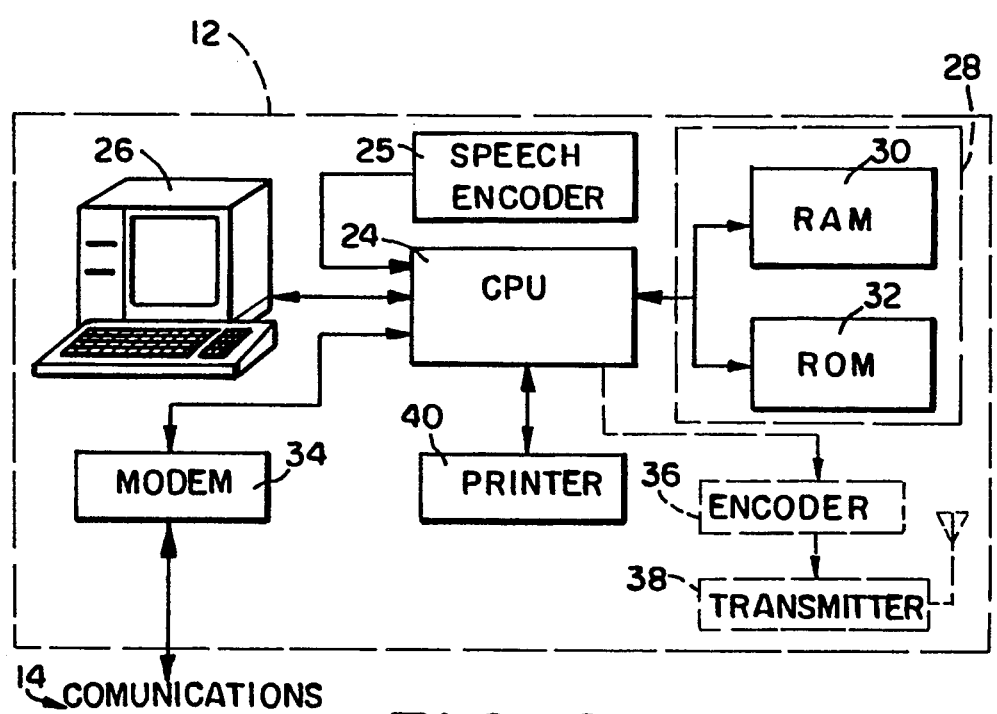
FIG. 2 is a more detailed schematic block diagram of the remote computer portion of the system of FIG. 1.
Figure 4:
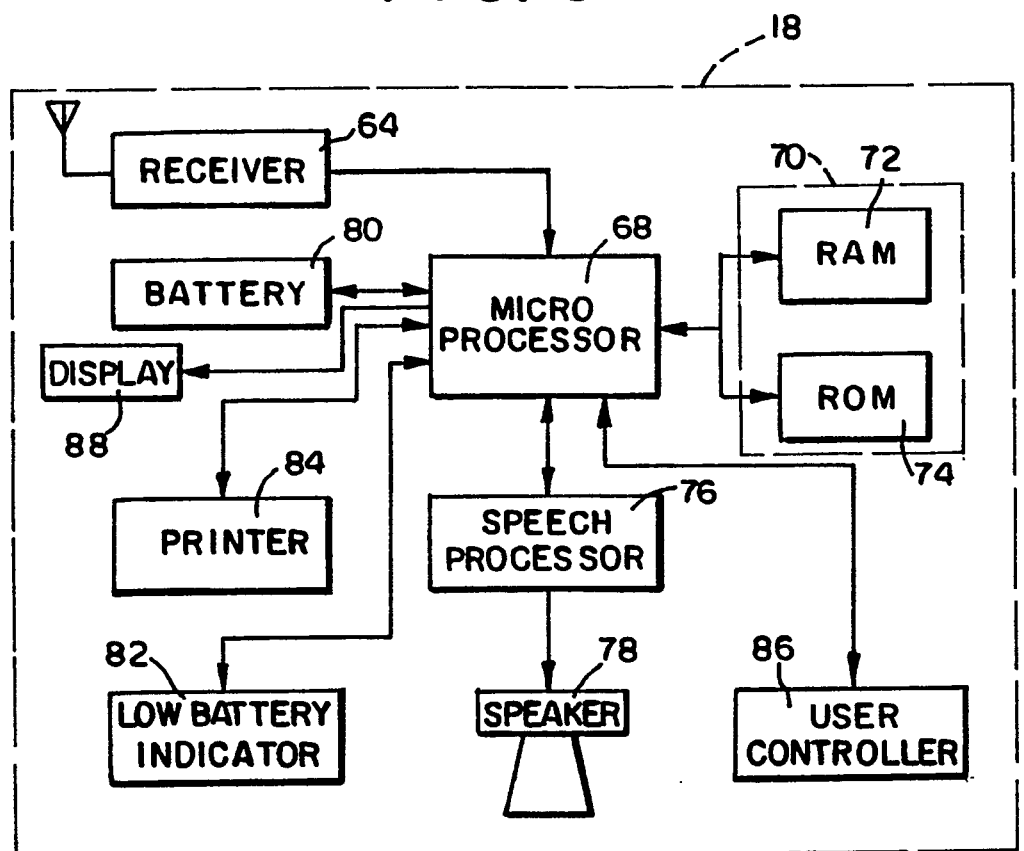
FIG. 4 is a more detailed schematic block diagram of a user unit of the system of FIG. 1.
Figure 8:
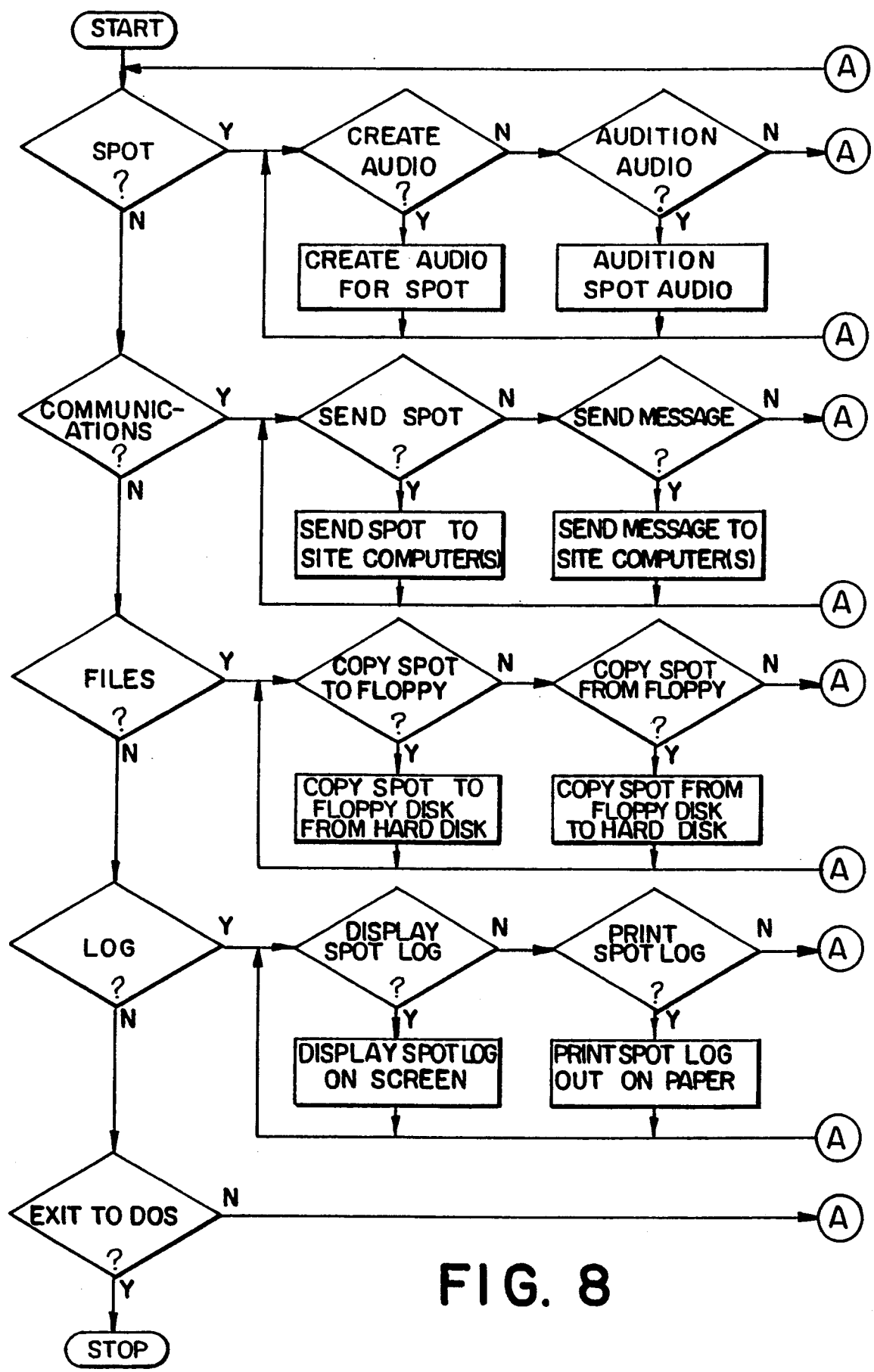
FIG. 8 (a-c) is a more detailed flow chart illustrating the operation of the remote computer portion of the system of FIG. 1.
Figure 8A:
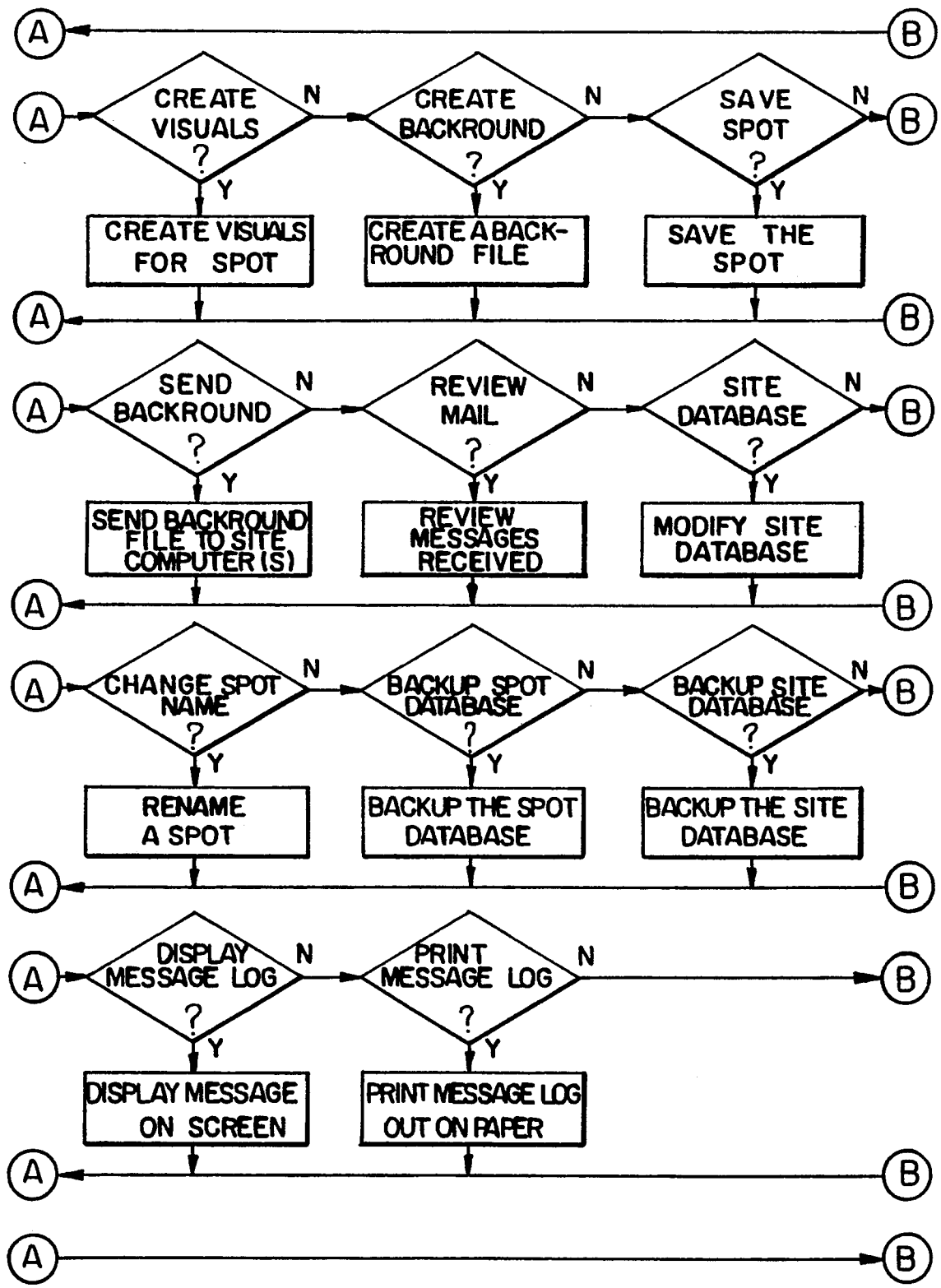
Figure 8B:
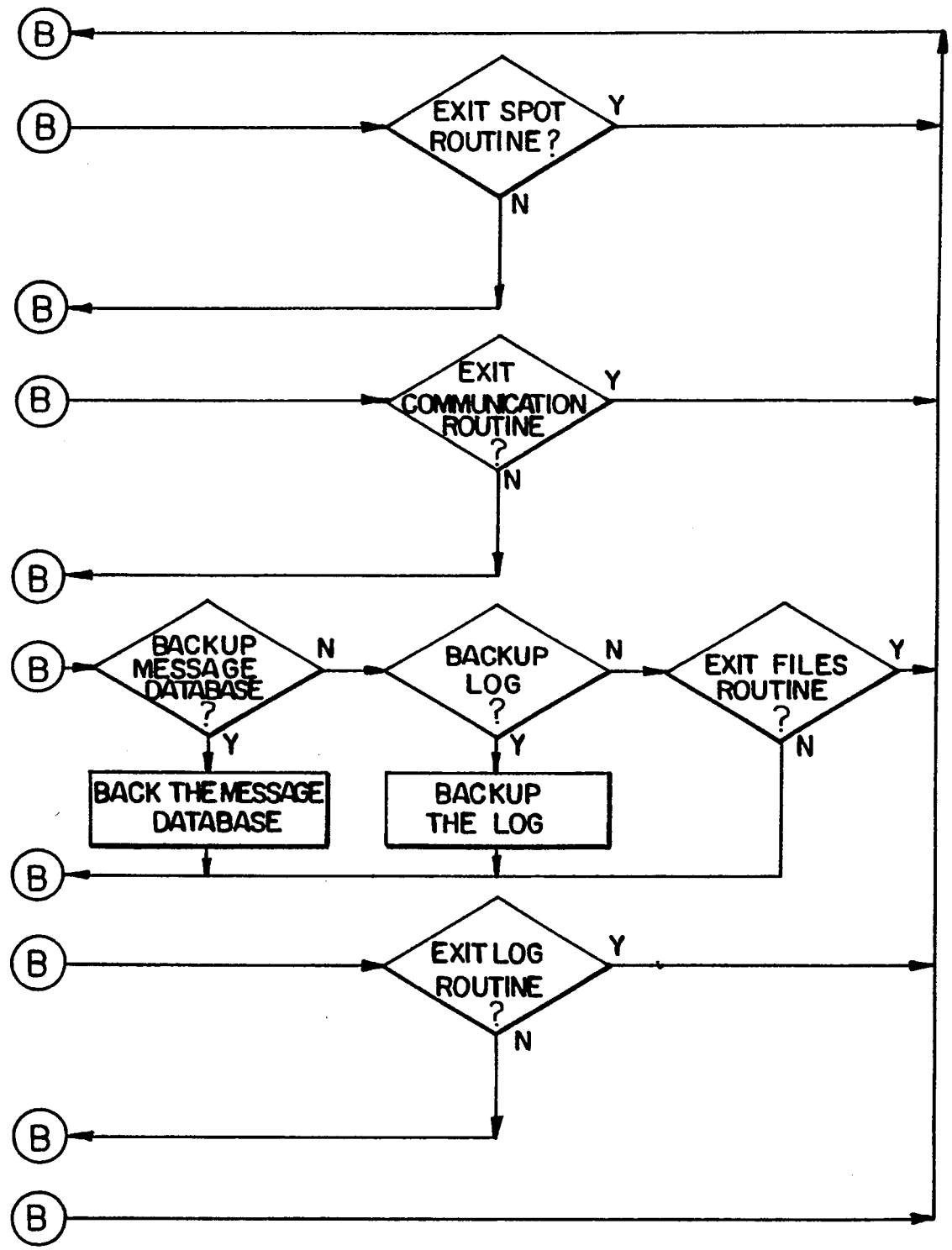

FIG. 2 is a more detailed schematic block diagram illustrating the structure of the presently preferred embodiment of the remotely located source of computer-based information or first computer 12. The operation of the first computer 12 is shown in FIG. 4 and FIG. 8 (a-c). The first computer 12 preferably comprises a commercially available computer of an AT or similar type, preferably containing either an 8286 or an 8386 CPU or processor 24, with a memory module 28, including a minimum of one megabyte of main or random access memory (RAM) 30, an input/output device 26 including a keyboard, 80 megabytes of memory in a hard disk drive, at least one high density floppy disk drive and a VGA or other type video display device. Preferably, the first computer 12 also includes some form of non-volatile or read only memory (ROM) or programmable read only memory (PROM) 32, in communication with the processor 24, either directly or along a standard memory bus. The read only memory 32 includes a set of computer instructions for a program for controlling the operation of the first computer 12.

The first computer 12 is also preferably equipped with a modem 34 to enable the encoded product or service data to be transmitted to the on-site computer 16, preferably by telephone line, data line, or any other standard communication link 14. Alternatively, the first computer 12 may include an encoder 36 and a transmitter 38, preferably a standard FM radio transmitter, which receives encoded data for direct radio transmission to the on-site computer 16.

The first computer 12 also includes a speech encoder 25 which is in communication with the processor 24. The speech encoder 25 includes a microphone or other direct audio input device (not shown) for receiving audio input signals (i.e., speech) and for converting the audio signals into electrical signals. A separate audio input (not shown) is also provided for receiving audio input signals which have already been converted to electrical signals to permit pre-recorded audio signals to be input to the speech encoder 25. The speech encoder 25 receives the electrical audio signals and digitizes and encodes the received signals for storage at predetermined locations within the memory of the first computer 12.

Finally, the first computer 12 contains a standard printer 40 so information generated or stored within the computer 12 can be recorded and saved to serve as a written record.

The remotely located or first computer 12 serves as an operation and control center for the system 10 shown in FIG. 1, and is responsible for generating and supplying information to the other parts of the system 10. The first computer 12 receives the information to be subsequently assembled or generated and transmitted to the rest of the system. The information is received by the speech encoder 25 and the keyboard or other input means 26, and upon receipt of the information the processor 24 begins to perform one of several functions. Immediately, the received data information is placed into storage 30, so if there is a failure at one of the other system parts, the information is not lost. The processor 26 also readies the data for transmission to the on-site computer 16 in FIG. 1. The first computer 12 may transmit encoded audio or speech data received from the speech encoder 25, either alone or in a data module, in combination with non-speech data such as pricing data. Because the audio data has been digitized, it can be manipulated and modified by the first computer 12 for transmission in whole or in part, in any desired order, and at any desired time. Preferably, the encoded audio data is stored in predetermined memory locations to facilitate recall and manipulation by the first computer 12.

In the preferred embodiment, once the data is generated it is transmitted from the processor 24, through a modem 34 connected with a communications link 14, usually a telephone line, to the on-site computer 16. Alternatively, the information may be encoded and transmitted to the on-site computer 16 by the transmitter 38.

Figure 3:
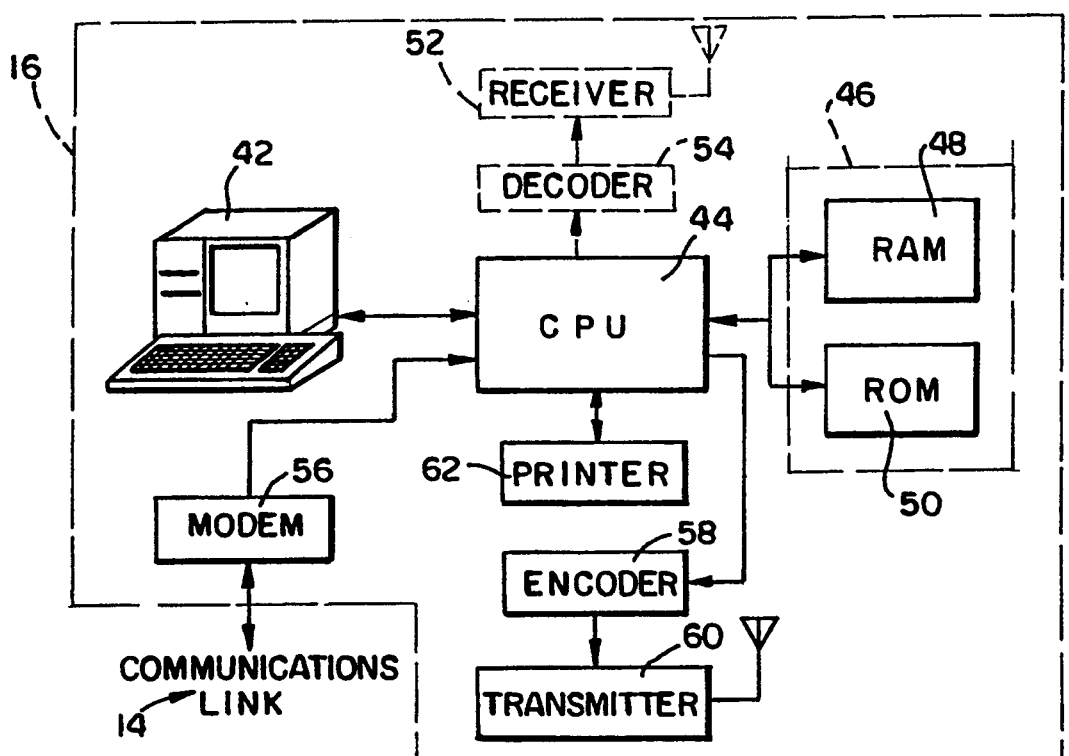
FIG. 3 is a more detailed schematic block diagram of the on-site computer of the system of FIG. 1.
Figure 5:
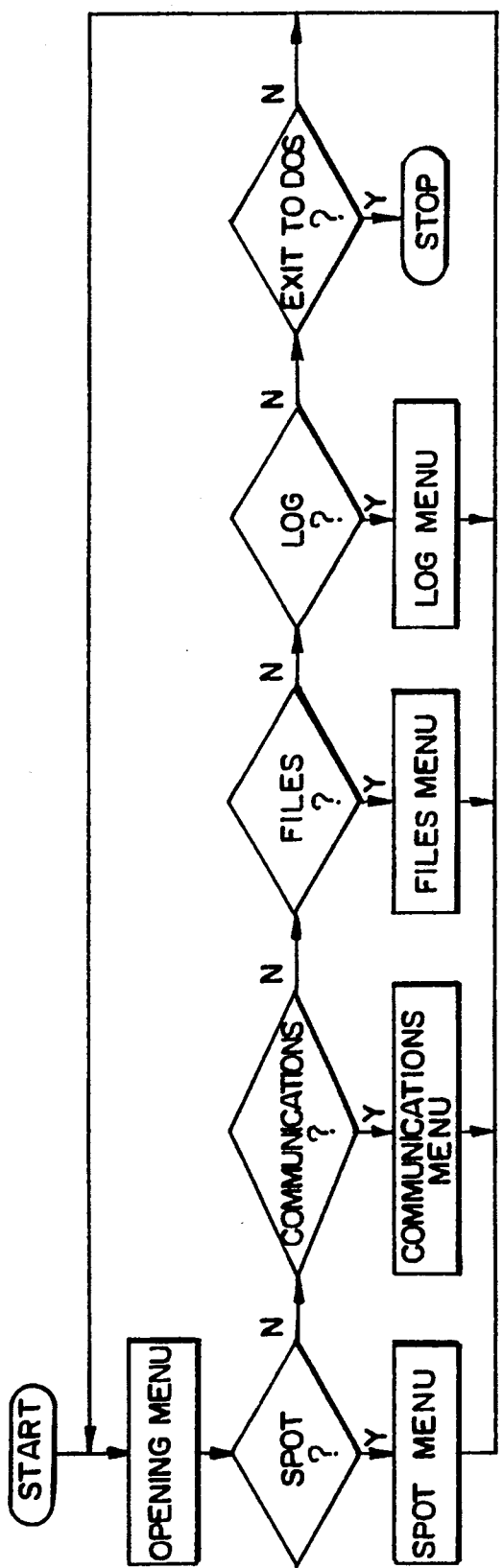
FIG. 5 is a top level flow chart illustrating the operation of the on-site computer portion of the system of FIG. 1.
Figure 7:
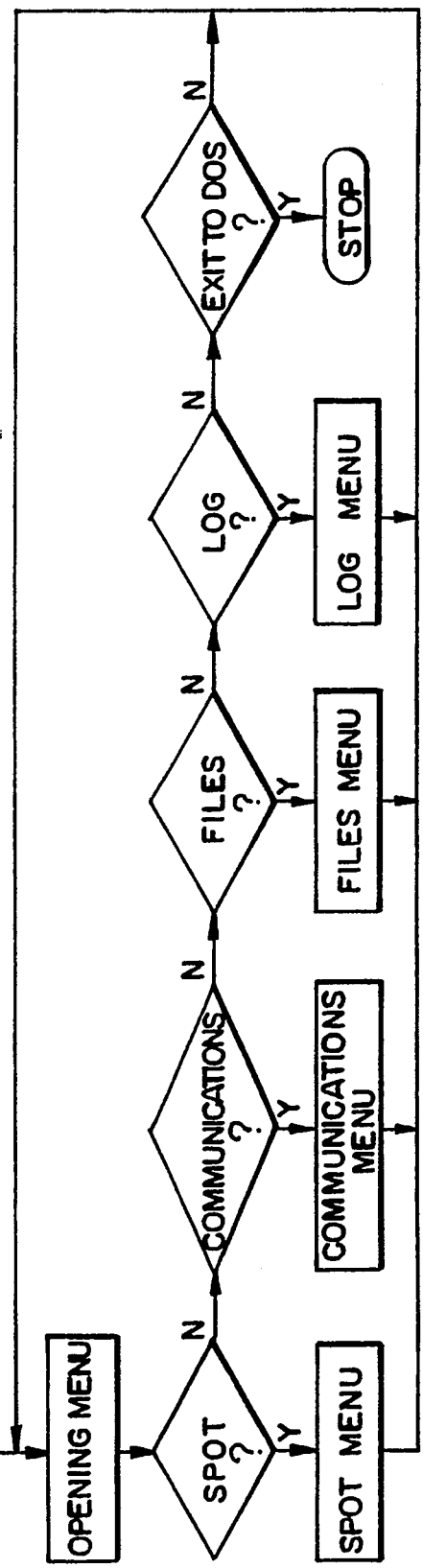
FIG. 7 is top level flow chart illustrating the operation of the remote computer portion of the system of FIG. 1.
Figure 6:
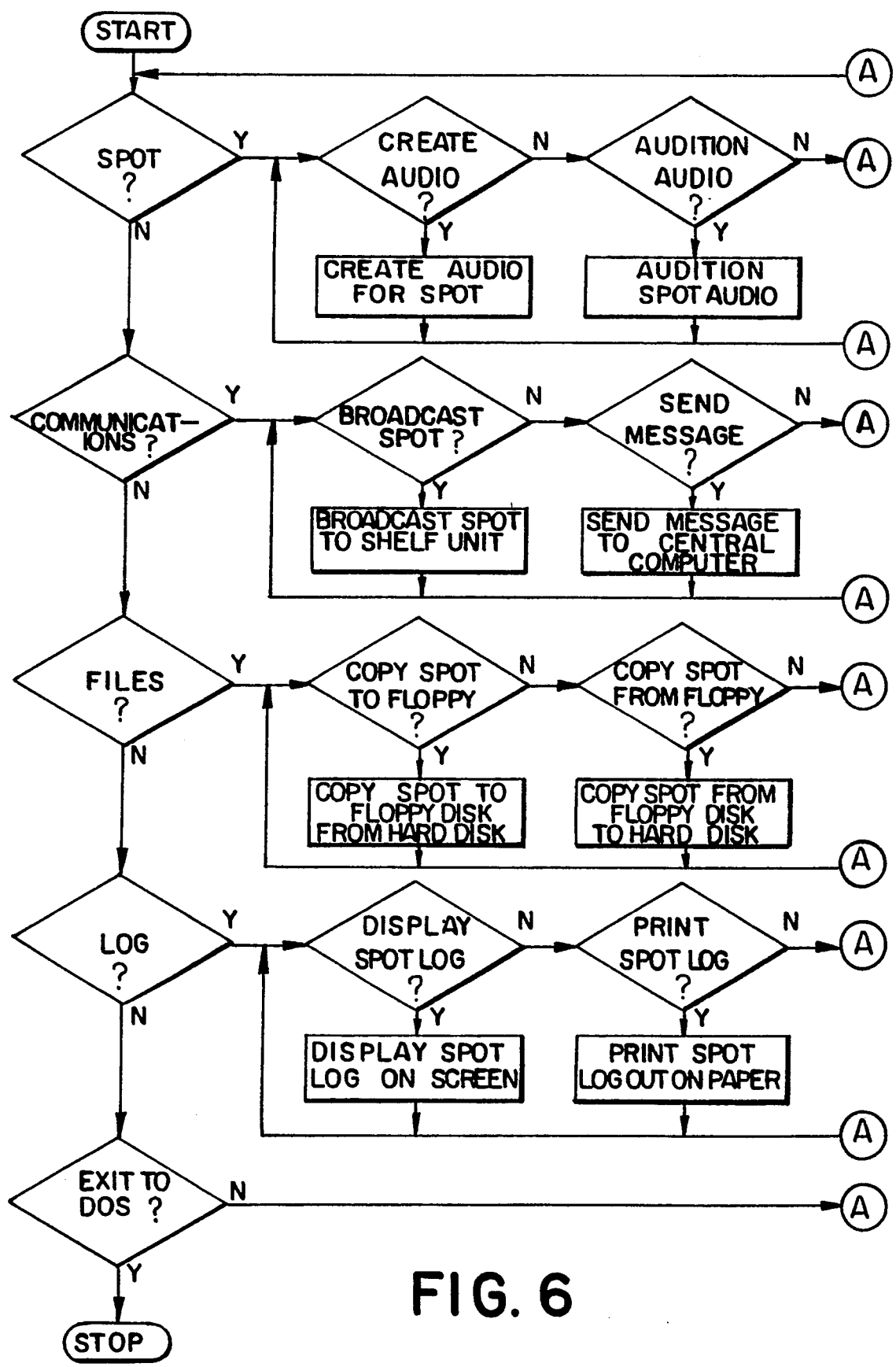
FIG. 6 (a-c) is a more detailed flow chart illustrating the operation of the on-site computer portion of the system of FIG. 1.
Figure 6A:
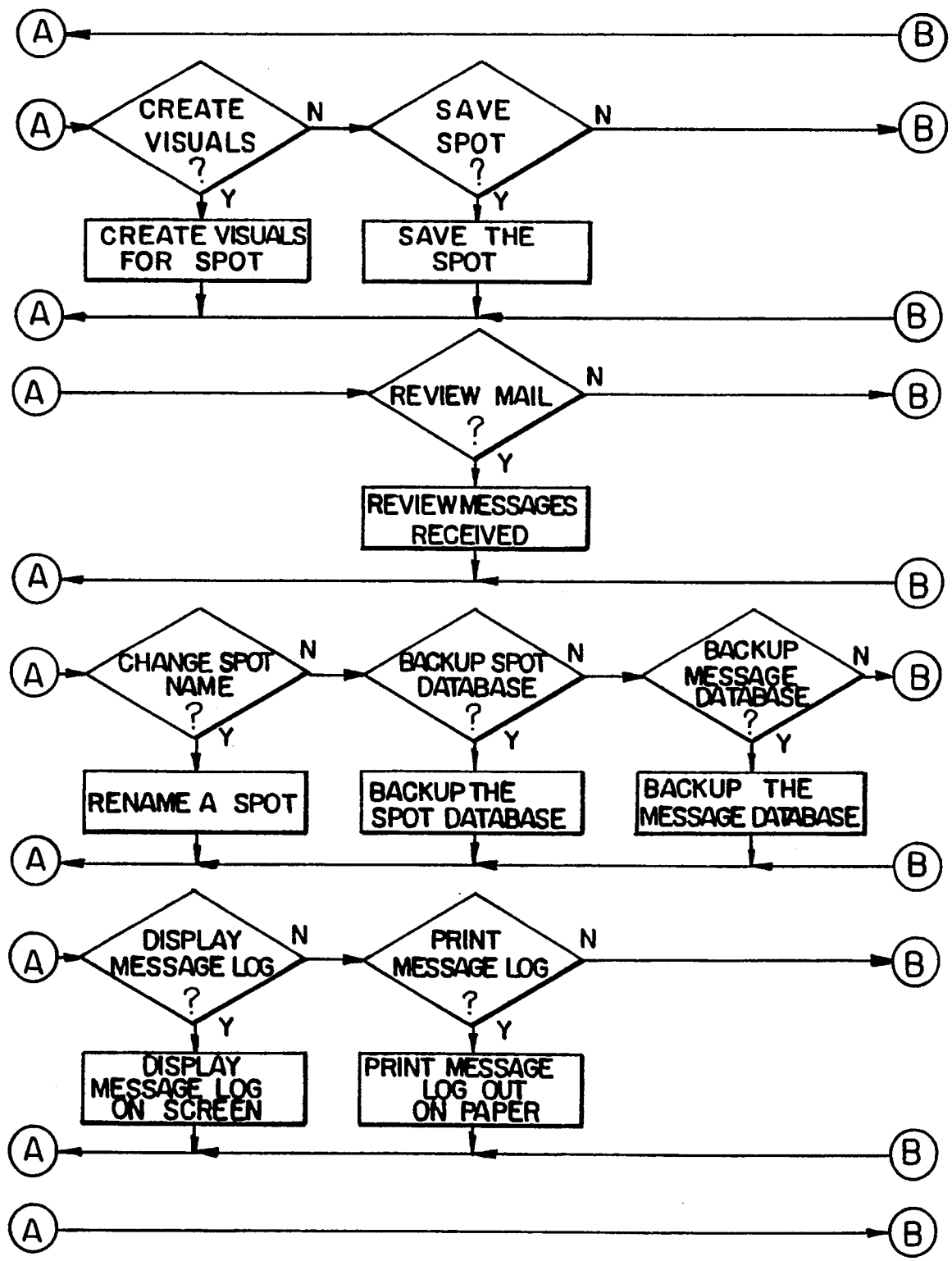
Figure 6B:
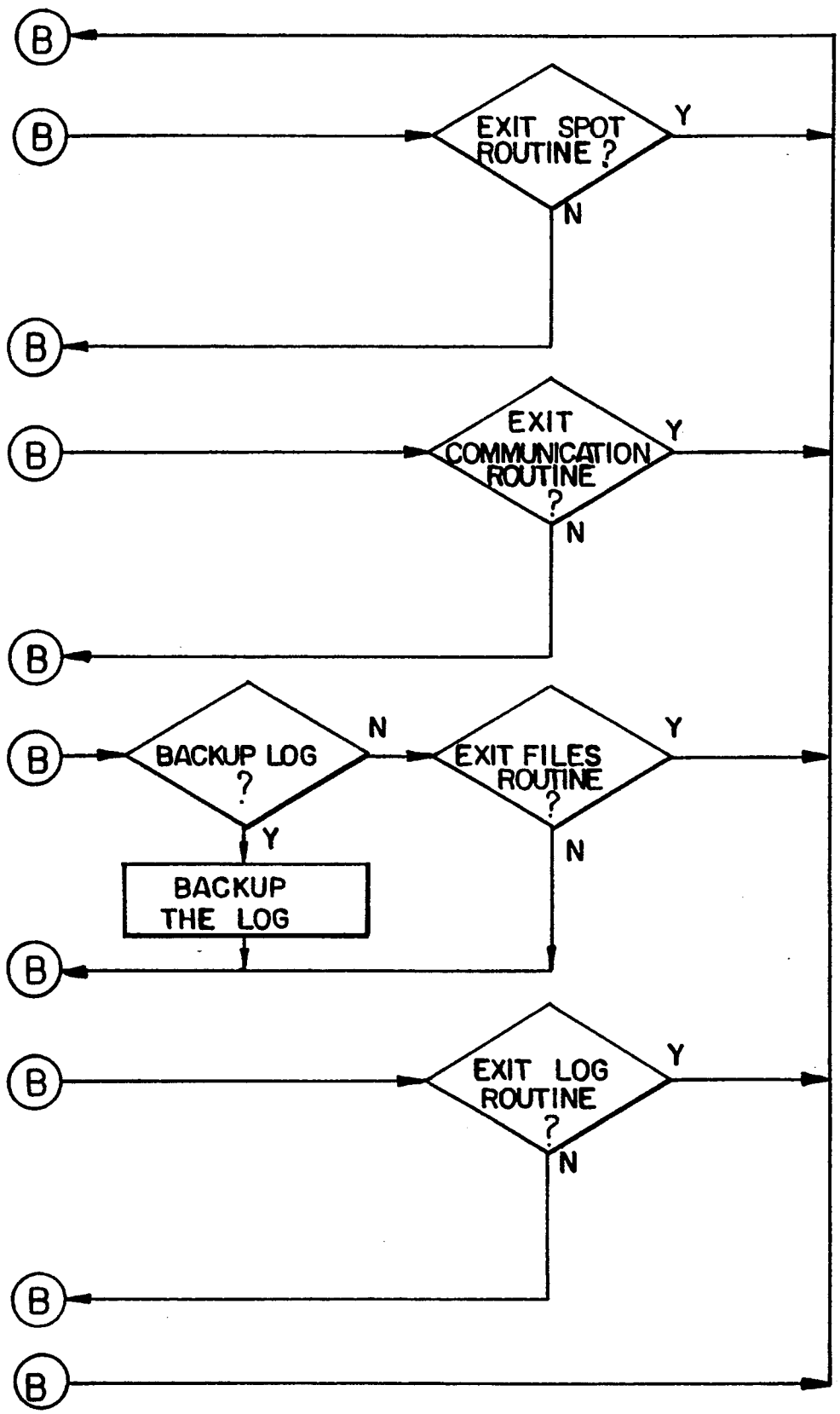

FIG. 3 is a more detailed functional schematic block diagram illustrating the structure of the on-site computer 16. The operation of the on-site computer is shown in FIG. 5 and FIG. 6 (a–c). The on-site computer 16 shown in FIG. 3 is preferably a personal computer such as an IBM Model XT which includes a CPU or processor 44, a memory module 46 including both random access memory (RAM) 48, and some form of non-volatile or read only memory (ROM) or programmable read only memory (PROM) 50, both of which are in communication with the processor 44, either directly or along a standard memory bus. The on-site computer 16 further includes an input/output device 42 including a keyboard, floppy disk drive, hard disk drive and video display device, and a modem 56 communicating with communications link 14 for receiving data from the first computer 12 in the preferred embodiment over a telephone line. In an alternative embodiment, the on-site computer 16 also has a receiver, preferably an FM receiver 52 for receiving information generated by the first computer 12 and a decoder 54. As a third alternative, information from the remote computer 12 may be transferred or transmitted to the on-site computer 16 via one or more floppy disks (not shown). The on-site computer 16 also includes a printer 62 for providing a hard copy of the stored data.

After processing, the received data may be placed into the RAM storage 48, the ROM storage 50, on the hard disk or onto a floppy disk (not shown). When the data is to be transmitted to the user units 18, 20 in the preferred embodiment, the data is retrieved from storage by the processor 44 and is sent to an encoder 58. Preferably the processor 44 or the encoder 58 adds an address to the data to facilitate transmission of the data to the particular user unit to which the data pertains. The data is encoded into a form suitable for transmission and is sent to a transmitter 60. Transmitter 60 in the preferred embodiment, is a low-power FM radio transmitter with a limited range. Alternatively, the data may be transmitted to the user units 18, 20 by a low-power infrared transmission system or any other type of wireless, limited range communication system.

The advantage of having an on-site computer 16 is that it may be desired to check and/or modify or otherwise arrange the data received from the remotely located first computer 12 utilizing the input/output device 42. In this manner, the on-site manager is given flexibility with respect to the information provided to a user. While, in the embodiment shown in FIG. 2, the data input means is shown, it should be appreciated by those skilled in the art that the data input functions could be performed in several different ways. A complete description of the structure and the operation of the input/output 42 is not necessary for an understanding of the present invention.

The on-site computer 16 receives all of the data pertaining to all of the particular products or services from the computer 12. In the preferred embodiment, the information is received through the communications link 14 and modem 56 in order to make the received data compatible for the processor 44. After the processor 44 receives the information, it places the data into predetermined storage locations within either the RAM 48 or the hard disk. When the particular data pertaining to a particular product or service is to be sent to a user unit in the preferred embodiment, it is recalled from storage by the processor 44 which subsequently sends the recalled data to the encoder 58 which provides an address to the data so when the data is sent to the user unit, it reaches the user unit associated with the particular data. Upon leaving the encoder 58, the information is sent to the transmitter 60, from which the information is transmitted to the user units.

Figure 9:
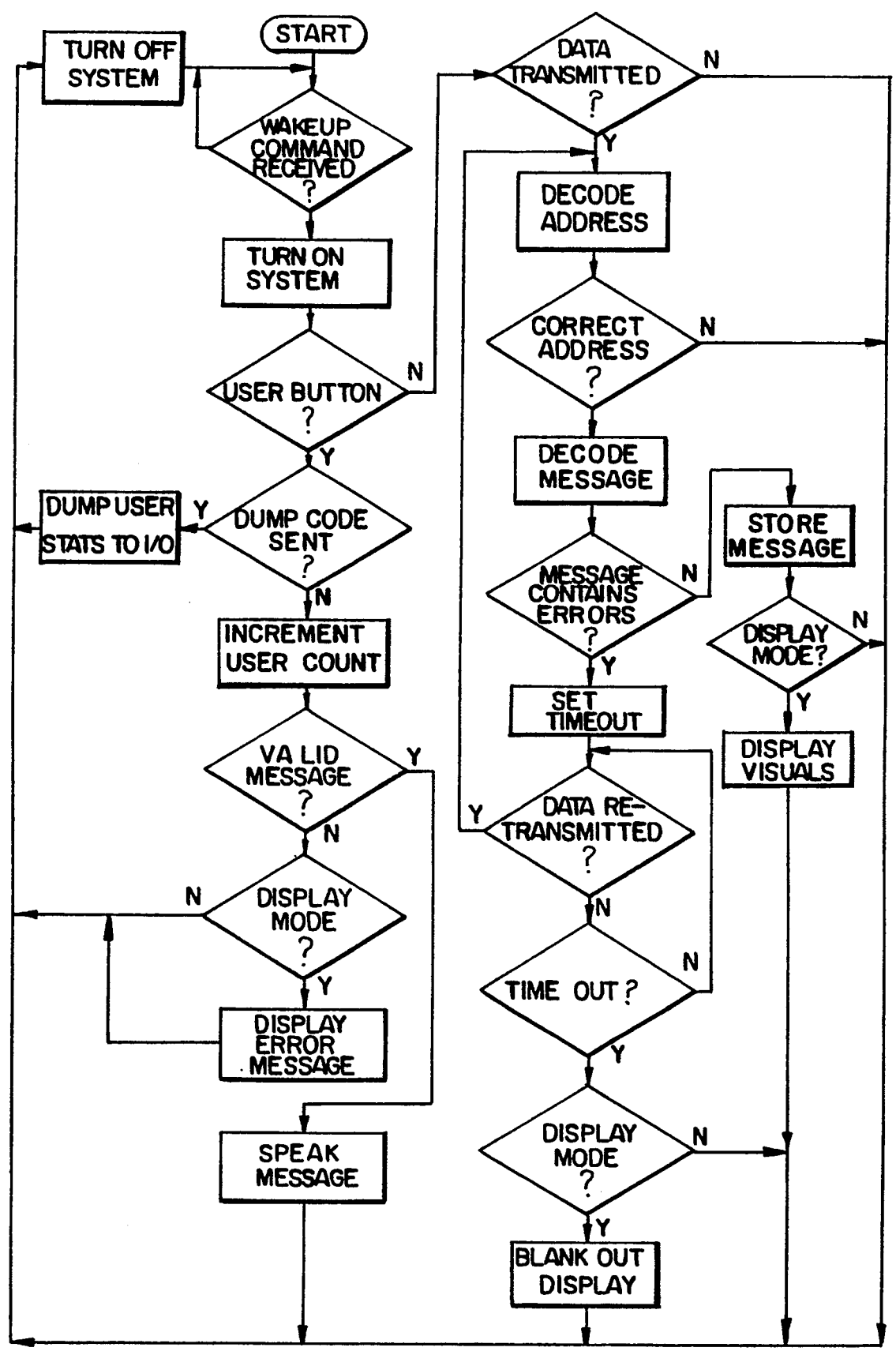
FIG. 9 is a flow chart illustrating the operation of a user unit of the system of FIG. 1.

One of the user units 18, as indicated in FIG. 1, is shown in FIG. 4 in a more detailed functional schematic block diagram illustrating the structure of the preferred embodiment. The operation of a user unit 18 is shown in FIG. 9. The user unit 18 is representative of the user units placed at each product or service location within the facility and for which information is to be made available to a user. The user unit 18 is activated by the user with the user controller 86, which may be a push button switch, proximity switch or any other similar device adapted to either close or open a circuit for activation of the user unit 18.

The user unit 18 includes a receiver 64 for receiving the data transmitted from the on-site computer 16 shown in FIG. 3. In the presently preferred embodiment, the receiver 64 is a standard FM radio receiver for receiving the transmission from the low-power FM radio transmitter 60. Receivers of this type are commercially available from numerous manufacturers. Complete details of the structure and operation of the receiver 64 are not necessary for an understanding of the present invention.

Additionally, the user unit 18 contains a microprocessor 68, and a memory module 70 containing both random access memory (RAM) 72 and some form of non-volatile or read only memory (ROM) or programmable read only memory (PROM) 74. In the presently preferred embodiment, the ROM memory 74 holds the computer program which is employed to control the operation of the processor 68. Both types of memory are in communication with the processor 68, either directly or along a standard memory bus.

The microprocessor 68 is also in communication with both a battery unit or battery 80, which supplies power to the user unit 18, and a low battery indicator 82, which may be in the form of an indicator light, audio signal or the like. The microprocessor 68 periodically tests the battery 80 and activates the low battery indicator 82 for indicating when the power level in the battery falls below a predetermined minimum power level.

Both the battery 80 and the low-battery indicator 82 are commercially available from numerous manufacturers, and details of the structure and operation of the battery 80 and low battery indicator 82 are not necessary for an understanding of the present invention.

The output of the microprocessor 68 in the preferred embodiment is also applied to a speech processor 76 for taking the digital output (encoded audio data) of the microprocessor 68 and converting it into an audio speech form. The processor 76 outputs the converted data into a speaker 78 for broadcasting the converted data into an audible form understandable by the user. Alternatively, a portion of the data from the microprocessor 68 can be sent to a printer 84, from which the user can obtain a visual copy of the product or service information. As a further alternative, a portion of the data from the microprocessor can be sent to a display device such as a liquid crystal display 88 for display of some of the data to the user. The present invention also contemplates any combination of audio, visual and printed information being provided to the user.

Product or service information is transmitted in the form of audio and other encoded data to the user unit 18 from the on-site computer 16 depicted. The user unit 18 receives the data through the receiver 64 which sends the received data to the decoder 66. In the preferred embodiment, the microprocessor 68 recognizes the address portion of the encoded data and compares it to a predetermined internal address data code associated with each particular user unit 18, so only data pertaining to the particular product or service associated with the particular user unit is stored in the RAM 72. The data remains in storage until it is recalled by the processor 68, or until it is replaced by more up-to-date data received from the on-site computer 16.

Upon activation of the user unit 18 by the user through the use of the user controller 86, the processor 68 responds and retrieves the stored data from RAM 72. Upon the recalling of the data, the processor 68 in the presently preferred embodiment sends the recalled data to the speech processor 76 which converts it into an audio form for broadcast by the speaker 78.

Since the user unit 18 is only activated upon user request through the user controller 86, it is not desirable for the unit 18 to be a full power all the time. Keeping the user unit 18 at full power results in the continuous replacing of the battery 80 which causes unit down time serving only to aggravate the user. To remedy this problem, the low battery indicator 84 is in communication with the microprocessor 68 which monitors the battery 80 and signals to the low battery indicator 82 when the level of the battery 80 falls below a predetermined minimum power level.

From the foregoing description, it can be seen that the present invention comprises a system and method for obtaining information concerning a product or service at the location of the product or service. It will be appreciated by those skilled in the art that changes and modifications may be made to the above-described embodiment without departing from the inventive concept thereof. It is understood, therefore, that the present invention is not limited to the particular embodiment disclosed, but is intended to include all modifications and changes which are within the scope and spirit of the invention as defined by the appended claims.

We claim:

1. A system for providing product or service information to a user within a facility upon an affirmative request by the user comprising in combination:
   a remotely located source of computer-based information for generating and transmitting encoded data, including encoded audio data, pertaining to a plurality of particular products or services;
   an on-site computer within the facility and in communication with said remote information source for receiving and storing the data from said remote information source; and
   a plurality of user units within the facility, each unit being in communication with the on-site computer for receiving and storing data from said on-site computer which pertains to a single particular product or service, the unit being secured adjacent to and being exclusively associated with the single particular product or service, the unit adapted to provide audible product or service information for the single particular product or service to the user, the unit providing such information only upon an affirmative activation of the unit by the user.

2. A system as recited in claim 1 wherein each user unit comprises in combination:
   means for user activation of said unit;
   means for receiving and decoding said product or service information in the form of data pertaining to the particular product or service, the said receiving means including means for decoding said data;
   means for storing the decoded data; and
   means for retrieving and converting the stored data into an audible output form understandable by said user.

3. A system as recited in claim 2 wherein said means for receiving said product or service information comprises an FM radio receiver.

4. A system as recited in claim 2 wherein said means for storing said data comprises a microprocessor and a memory means.

5. A system as recited in claim 2 wherein said means for converting said data into an audible output form comprises a speech processor for converting said encoded audio data into an audible form.

6. A system as recited in claim 4 wherein said microprocessor includes means for placing said unit into a low power standby mode when said unit is not activated by a user or is not receiving data.

7. A system as recited in claim 2 wherein said unit is battery powered.

8. A system as recited in claim 7 wherein said unit further comprises means for indicating when the power of said battery falls below a predetermined minimum power level.

9. A system as recited in claim 1 wherein said communication between said remote source and said on-site computer comprises an FM radio transmitter at said remote location and an FM receiver at said facility for radio transmission of said data to said on-site computer.

10. A system as recited in claim 1 wherein said communication between said remotely located source and said on-site computer comprises a modem in communication with said remotely located source, a modem in communication with said on-site computer and a communications link between the modems.

11. A system as recited in claim 1 wherein said means of communication from said on-site computer to said unit comprises a low-powered FM radio transmitter connected to the on-site computer and an FM receiver connected with the unit.

12. A system as recited in claim 1 wherein said unit includes a printer for outputting said data into a printed form.

13. A method of providing product or service information to a user at a location within a facility associated with a single particular product or service comprising:
   providing a user unit at the location within the facility associated with a single particular product or service;
   storing within the user unit encoded audio data pertaining to the single particular product or service;
   securing the user unit at the location;
   exclusively associating the user unit with the single particular product or service;
   recalling the stored data pertaining to the single particular product or service only upon an affirmative activation of the user unit by a user; and
   converting the recalled data into an audio output form understandable by the user.

14. A method as recited in claim 13 further comprising:
   generating data pertaining to the particular product or service at a location remote from the facility;
   encoding the generated data at the remote location;
   transmitting the encoded data from the remote location to the facility; and
   receiving and storing the transmitted encoded data at the facility.

15. The method as recited in claim 14 further comprising:
   receiving, decoding and storing the transmitted encoded data for a plurality of products or services at an on-site computer within the facility;
   recalling data for the particular product or service;
   encoding the recalled data; and
   transmitting the encoded recalled data to a user unit for the particular product or service.

* * * * *